United States Patent
Chen et al.

(10) Patent No.: US 9,705,653 B2
(45) Date of Patent: Jul. 11, 2017

(54) DOWNLINK CONTROL TRANSMISSION IN MULTICARRIER OPERATION

(75) Inventors: Wanshi Chen, San Diego, CA (US); Jelena M. Damnjanovic, Del Mar, CA (US); Juan Montojo, San Diego, CA (US); Sai Yiu Duncan Ho, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 677 days.

(21) Appl. No.: 12/764,831

(22) Filed: Apr. 21, 2010

(65) Prior Publication Data

US 2011/0103509 A1    May 5, 2011

Related U.S. Application Data

(60) Provisional application No. 61/175,411, filed on May 4, 2009.

(51) Int. Cl.
  *H04K 1/10*    (2006.01)
  *H04L 27/28*   (2006.01)
  (Continued)

(52) U.S. Cl.
  CPC .......... *H04L 5/0053* (2013.01); *H04L 5/0007* (2013.01); *H04W 4/06* (2013.01);
  (Continued)

(58) Field of Classification Search
  CPC .... H04L 5/0007; H04L 5/0053; H04W 24/00; H04W 28/06; H04W 4/06; H04W 72/00
  (Continued)

(56) References Cited

U.S. PATENT DOCUMENTS

2005/0187995 A1    8/2005    Smolyar et al.
2008/0200203 A1    8/2008    Malladi et al.
(Continued)

FOREIGN PATENT DOCUMENTS

| CN | 101272540 A | 9/2008 |
| KR | 20090033001 A | 4/2009 |
| WO | WO2009041779 | 4/2009 |

OTHER PUBLICATIONS

3GPP: 3rd Generation Partnership Project. "Technical Specification Group Radio Access Network; Evolved Universal Terrestrial Radio Access (E-UTRA); Physical layer procedures (Release 8)." 3GPP TS 36.213 V8.2.0 (Mar. 2008).

(Continued)

*Primary Examiner* — Nader Bolourchi
(74) *Attorney, Agent, or Firm* — Paul Kuo

(57) ABSTRACT

A wireless communication network distributes resources for a Physical Downlink Control CHannel (PDCCH) over multiple carriers in accordance with a constraint that limits a number of blind decoding actions required by user equipment (UE). Distribution can entail segregating UE-specific and common search spaces to different monitored carriers. Distribution can entail segregating aggregation levels to different monitored carriers. Distribution can entail segregating a number of decoding candidates for a given aggregation level to different monitored carriers. The distribution can be orthogonal or non-orthogonal, and can be UE-based or per cell-based. The distribution can be static, semi-static or hop with time.

58 Claims, 13 Drawing Sheets

(51) Int. Cl.
*H04L 5/00* (2006.01)
*H04W 4/06* (2009.01)
*H04W 24/00* (2009.01)
*H04W 28/06* (2009.01)
*H04W 72/00* (2009.01)

(52) U.S. Cl.
CPC ............ *H04W 24/00* (2013.01); *H04W 28/06* (2013.01); *H04W 72/00* (2013.01)

(58) Field of Classification Search
USPC ........................................ 375/295, 316, 260
See application file for complete search history.

(56) References Cited

U.S. PATENT DOCUMENTS

| | | |
|---|---|---|
| 2008/0232559 A1 | 9/2008 | Meng et al. |
| 2009/0088148 A1* | 4/2009 | Chung et al. ................. 455/423 |
| 2011/0083066 A1* | 4/2011 | Chung et al. ................. 714/807 |

OTHER PUBLICATIONS

Catt: "DL Control Channel Scheme for LTE-A" 3GPP Draft; RI-091524, 3rd Generation Partnership Project (3GPP), Mobile Competence Centre ; 650, Route Des Lucioles ; F-06921 Sophia-Antipolis Cedex ; France, no. Seoul, Korea; Mar. 18, 2009, Mar. 18, 2009 (Mar. 18, 2009), XP050339082 [retrieved on Mar. 18, 2009].
International Search Report and Written Opinion—PCT/US2010/033621, International Search Authority—European Patent Office—Aug. 11, 2010.
Motorola: "PDCCH Search Space Assignment Hashing Function" 3GPP Draft; RI-081672 (RI-081289)—PDCCH Search Space Assignment Hashing Function_F, 3rd Generation Partnership Project (3GPP), Mobile Competence Centre ; 650, Route Des Lucioles ; F-06921 Sophia-Antipolis Cedex ; France, vol. RAN WGI, no. Shenzhen, China; Apr. 9, 2008, Apr. 9, 2008 (Apr. 9, 2008), XP050110062 [retrieved on Apr. 9, 2008].
Nokia et al: "Handling DCI formats and blind decoding in LTE-Advanced" 3GPP Draft; RI-091768, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, Apr. 28, 2009 (Apr. 28, 2009), XP050339291 [retrieved on Apr. 28, 2009].
Qualcomm Europe: "PDCCH Blind Decodes" 3GPP Draft; RI-080646, 3rd Generation Partnership Project (3GPP), Mobile Competence Centre ; 650, Route Des Lucioles ; F-06921 Sophia-Antipolis Cedex ; France, vol. RAN WGI, no. Sorrento, I t a l y; Feb. 6, 2008, Feb. 6, 2008 (Feb. 6, 2008), XP050109147 [retrieved on Feb. 6, 2008].
Samsung: 3GPP Draft; R1-081212 UE-Specific Search Spaces, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; Mar. 26, 2008, Mar. 26, 2008 (Mar. 26, 2008), XP050109656, [retrieved on Mar. 26, 2008].
Samsung: "Configuration of PDCCH Monitoring Set" 3GPP Draft; RI-080028 PDCCH Restriction, 3rd Generation Partnership Project (3GPP), Mobile Competence Centre ; 650, Route Des Lucioles ; F-06921 Sophia-Antipolis Cedex ; France, vol. RAN WGI, no. Sevilla, Spain; Jan. 8, 2008, Jan. 8, 2008 (Jan. 8, 2008), XP050108571 [retrieved on Jan. 8, 2008].
Ericsson: "PDCCH blind decoding—Outcome of offline discussions" No. R1-081101, Feb. 11, 2008 (Feb. 11, 2008), XP002542364 Retrieved from the Internet: URL:http://ftp.3gpp.org/tsg_ran/WG1_RL1/TSGR1_52/Docs/"C=N;O=D> [retrieved on Aug. 21, 2009].
Taiwan Search Report—TW099114282—TIPO—Apr. 14, 2013.
Huawei: "PDCCH design for carrier aggregation", 3GPP TSG RAN WG1#55bis R1-090127, Jan. 12, 2009, 5 pages.
Motorola: "Control channel structure extension for post Release 8 LTE" 3GPP Draft; R1-091944—Control Channel Structure for LTE-A_FIN, 3rd Generation Partnership Project (SGPP), Mobile Competence Centre ; 650, Route Des Lucioles ; F-06921 Sophia-Antipolis Cedex ; France, no. San Francisco, USA; Apr. 28, 2009, Apr. 28, 2009 (Apr. 28, 2009), XP050339420, pp. 1-4.

\* cited by examiner

DOWNLINK CONTROL TRANSMISSION IN MULTICARRIER OPERATION

CLAIM OF PRIORITY UNDER 35 U.S.C. §119

The present Application for patent claims priority to Provisional Application No. 61/175,411 entitled "DOWNLINK CONTROL TRANSMISSION IN MULTICARRIER OPERATION" filed May 4, 2009, and assigned to the assignee hereof and hereby expressly incorporated by reference herein.

BACKGROUND

Field

The present disclosure relates generally to communication, and more specifically to techniques for transmitting information in a wireless communication network.

Background

The present disclosure relates generally to communication, and more specifically to techniques for transmitting information in a wireless communication network.

The 3rd Generation Partnership Project (3GPP) Long Term Evolution (LTE) represents a major advance in cellular technology and is the next step forward in cellular 3G services as a natural evolution of Global system for mobile communications (GSM) and Universal Mobile Telecommunications System (UMTS). LTE provides for an uplink speed of up to 75 megabits per second (Mbps) and a downlink speed of up to 300 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for monitoring a Physical Downlink Control CHannel (PDCCH) in a wireless communication system for receiving broadcast, multicast or unicast information by employing a processor executing computer executable instructions stored on a computer readable storage medium to implement the following acts: A constraint is accessed for a Physical Downlink Control CHannel (PDCCH) that limits mapping of decoding candidates distributed on a plurality of carriers. A reduced set of the plurality of decoding candidates is monitored in accordance with the constraint. The reduced set of decoding candidates is blind decoded.

In another aspect, a computer program product is provided for monitoring a Physical Downlink Control CHannel (PDCCH) in a wireless communication system for receiving broadcast, multicast or unicast information. At least one computer readable storage medium stores computer executable instructions that, when executed by the at least one processor, implement components: A first set of instructions causes a computer to access a constraint for a Physical Downlink Control CHannel (PDCCH) that limits mapping of decoding candidates distributed on a plurality of carriers. A second set of instructions causes the computer to monitor a reduced set of decoding candidates in accordance with the constraint. A third set of instructions causes the computer to blind decode the reduced set of decoding candidates.

In an additional aspect, an apparatus is provided for monitoring a Physical Downlink Control CHannel (PDCCH) in a wireless communication system for receiving broadcast, multicast or unicast information. At least one computer readable storage medium stores computer executable instructions that when executed by the at least one processor implement components: Means is provided for accessing a constraint for a Physical Downlink Control CHannel (PDCCH) that limits mapping of decoding candidates distributed on a plurality of carriers. Means are provided for monitoring a reduced set of decoding candidates in accordance with the constraint. Means are provided for blind decoding the reduced set of decoding candidates.

In a further aspect, an apparatus is provided for monitoring a Physical Downlink Control CHannel (PDCCH) in a wireless communication system for receiving broadcast, multicast or unicast information. A computing platform accesses a constraint for a Physical Downlink Control CHannel (PDCCH) that limits mapping of decoding candidates distribution on a plurality of carriers. A receiver monitors a reduced set of decoding candidates in accordance with the constraint. A decoder blind decodes the reduced set of decoding candidates.

In yet one aspect, a method is provided for transmitting a Physical Downlink Control CHannel (PDCCH) in a wireless communication system for sending broadcast, multicast or unicast information by employing a processor executing computer executable instructions stored on a computer readable storage medium to implement the following acts: A constraint is accessed for a Physical Downlink Control CHannel (PDCCH) that limits mapping of decoding candidates distributed on a plurality of carriers. The Physical Downlink Control CHannel (PDCCH) is mapped on the plurality of carriers in accordance with the constraint. The PDCCH is encoded and transmitted the PDCCH as mapped for user equipment (UE) to blind decode using a reduced set of decoding candidates.

In yet another aspect, a computer program product is provided for transmitting a Physical Downlink Control CHannel (PDCCH) in a wireless communication system for sending broadcast, multicast or unicast information. At least one computer readable storage medium stores computer executable instructions that, when executed by at least one processor, implement components: A first set of instructions causes a computer to access a constraint for a Physical Downlink Control CHannel (PDCCH) that limits mapping of decoding candidates distributed on a plurality of carriers. A second set of instructions causes the computer to map the Physical Downlink Control CHannel (PDCCH) on the plurality of carriers in accordance with the constraint. A third set of instructions causes the computer to encode and transmit the PDCCH as mapped for user equipment (UE) to blind decode using a reduced set of decoding candidates.

In yet an additional aspect, an apparatus is provided for transmitting a Physical Downlink Control CHannel (PDCCH) in a wireless communication system for sending broadcast, multicast or unicast information. At least one computer readable storage medium stores computer executable instructions that, when executed by the at least one processor, implement components comprising: Means are provided for accessing a constraint for a Physical Downlink Control CHannel (PDCCH) that limits mapping of decoding candidates distributed on a plurality of carriers. Means are provided for mapping the Physical Downlink Control CHannel (PDCCH) on the plurality of carriers in accordance with the constraint. Means are provided for encoding and transmitting the PDCCH as mapped for user equipment (UE) to blind decode using a reduced set of decoding candidates.

In yet a further aspect, an apparatus is provided for transmitting a Physical Downlink Control CHannel (PDCCH) in a wireless communication system for sending broadcast, multicast or unicast information. A computing platform accesses a constraint for a Physical Downlink Control CHannel (PDCCH) that limits mapping of decoding candidates distributed on a plurality of carriers. A mapping/encoder maps and encodes the Physical Downlink Control CHannel (PDCCH) on the plurality of carriers in accordance with the constraint. A transmitter transmits the PDCCH as mapped and encoded for user equipment (UE) to blind decode using a reduced set of decoding candidates.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
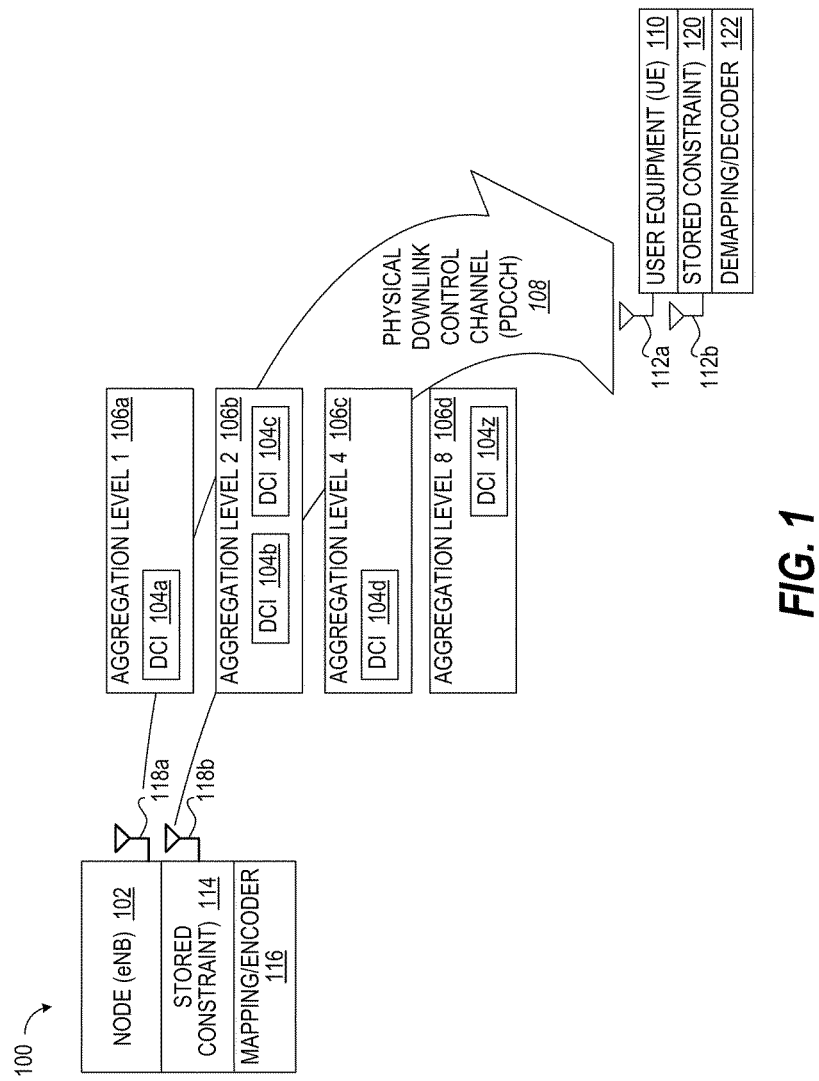
FIG. 1 depicts a block diagram of a communication system in which user equipment blind decodes candidate Downlink Control Information (DCI) on Physical Downlink Control Channels (PDCCH) using multicarrier operations.

With reference to FIG. 1, a communication system 100 has a node depicted as an evolved Base Node (eNB) 102 that constrains distribution of Downlink Control Information (DCI) 104a-104z on Aggregations Levels 1, 2, 4 and 8 depicted at 106a-106d of a Physical Downlink Control Channel (PDCCH) 108, respectively in a manner that enables user equipment (UE) 110 to successfully perform blind decoding using dual receivers 112a, 112b on two monitored carriers without overlap. In particular, the eNB 102 accesses a stored constraint 114, such as by a computing platform (not shown), used to limit how the PDCCH 108 is distributed by a mapping/encoder 116 for transmitting by antennas 118a, 118b. UE 110 accesses a stored constraint 120, such as by a computing platform (not shown), in order to determine how the distribution is limited, and thus the number of decoding candidates that have to be processed by a demapping/decoder 122.

Currently, in LTE release 8, downlink control (PDCCH) is transmitted for a UE using either a common search space or UE-specific search space. Each search space is further classified into PDCCH aggregation levels for different protection of the control channel transmission. In the common search space, two levels are defined: 4 CCEs or 8 CCEs, where each CCE consists of 36 resource elements (REs). In the UE-specific search space, four levels are defined: 1, 2, 4 and 8. For each aggregation level, each UE has to try to decode more than one possible candidate. To be more specific, for common search space level 4 (CCEs), up to 4 candidates, while for level 8, up to 2 candidates. For UE-specific search space, up to 6, 6, 2, and 2 candidates for levels 1, 2, 4 and 8, respectively. Each candidate may carry up to two downlink control information (DCI) formats. As a result, the total number of blind decodes for a UE is up to $(r+2)*2+(6+6+2+2)*2=44$ in any subframe. Note that the search spaces among common and UE-specific, and for different aggregation levels might overlap. This overlap, if such occurs, limits the possibility of scheduling a UE due to potential collision with other UEs. LTE-A offers the opportunity for a UE to monitor multiple carriers at the same time. In this case, it is desirable to limit the total number of blind decodes, e.g., still 44 (or higher but limited) comparing to the single-carrier operation. If a UE is required to monitor more than one carrier, but the PDDCH search space is limited by one carrier, and the number of the blind decodes is kept at 44, the limitation due to overlapping as indicated will still exist.

In order to improve the scheduling restriction/limitation discussed above, the innovation provides the following:

Distribute search space (UE-specific and common) to different monitored carriers, and/or Distribute the aggregation levels to different monitored carriers, and/or Distribute the number of decoding candidates for a given aggregation level to different monitored carriers.

The distribution can be orthogonal (still keeping 44 blind decodes), or non-orthogonal (>44 blind decodes). For instance, with 2 carriers, a UE may only monitor aggregation levels 1 and 4 in carrier 1, and 2 and 8 in carrier 2 (orthogonal distribution). Another example is to monitor levels 1, 4 and 8 in carrier 1 and 2 and 8 in carrier 2 (non-orthogonal distribution, the total number of blind decodes in this example is 48>44). The distribution can be done on a UE basis (or per cell basis), such as by referencing a user equipment identifier or cell identifier. To compute the actual distribution, one may utilize time information (e.g., SFN or subframe index, UE ID, cell ID, etc.) The distribution may hop with time.

The distribution can be uniformly or non-uniformly distributed across carriers. In particular, the distribution can be such that two carriers have the same number of decoding candidates (uniform) or different number (non-uniform) of decoding candidates. Further, the distribution can limit a total number of decoding candidates across a plurality of carriers to be the same as possible for a single carrier communication approach. For example, UE can be configured for monitoring three (3) downlink carriers. A single carrier configuration case would provide for a defined number of control symbols configured, a size of PHICH (e.g., DL ACK/NAK transmission (Tx) to support UL H-ARQ, etc.), a number of transmit antennas, the carrier bandwidth(s), etc. This single carrier configuration results in a maximum number of blind decoding candidates such as up to 44. Rather than utilizing 44 on each of the three downlink carriers, a constraint can limit the total amount of blind decoding to lesser number, such as 96. In one aspect, each of the carriers can be constrained to have a uniform number. For example, for a 96 decoding candidate constraint, each of the three carriers can have a limit of 32 decoding candidates. In another aspect, a subset of the carriers can have a uniform amount. For example, given a constraint of 96 and a single carrier number of 44, a first carrier can have 44, a second carrier can have 26 and a third carrier can have 26. In an additional aspect, the distribution imposed by a constraint can be non-uniform. For example, given a constraint of 96 and a single carrier number of 44, a first carrier can have 44, a second carrier can have 31, and a third carrier can have 21. For a further aspect, the constraint can impose a distribution that is both uniform and non-uniform. For example, given a constraint of 96 and a single carrier number of 44, a first carrier can have 44, a second carrier can have 44, and a third carrier can have 8. Yet another example is Carrier 1: 96, carrier 2: 0, and carrier 3: 0—that is, two carriers with 0 decoding candidates, while the first carrier has it all. In all the examples listed earlier (how to distribute 96 candidates), the reduced set of decoding candidates may come from limiting the search space (e.g., only supporting UE-specific search space), limiting the number of aggregation levels (e.g., only support levels 4 and 8), limiting the number of candidates per aggregation level, or a combination thereof. For instance, one carrier may have a full set of decoding candidates as in the single carrier case, while another carrier only supports UE-specific search space with limited aggregation levels and/or limited candidates per aggregation level.

In the extreme case, a carrier may not have any PDCCH decoding candidates, such that a UE will not monitor this carrier to decode PDCCH. In one example, given a constraint of 96 and a single carrier number of 44, a first carrier can have 48, a second carrier can have 48, and a third carrier can have 0 (no PDCCH decoding candidates). In yet another example, given a constraint of 96 and a single carrier number of 44, a first carrier can have 52, a second carrier can have 44, and a third carrier can have 0 (no PDCCH decoding candidates). It should be noted that typically a carrier with a large number of decoding candidates has more reliable PDCCH transmission, less loaded, less scheduling restrictions/collisions, etc. Such carrier(s) can be called primary carriers or anchor carriers. A UE can be semi-statically configured with such primary carriers. On the other hand, a carrier with small or zero number of decoding candidates is often interference limited or loaded.

Figure 2:
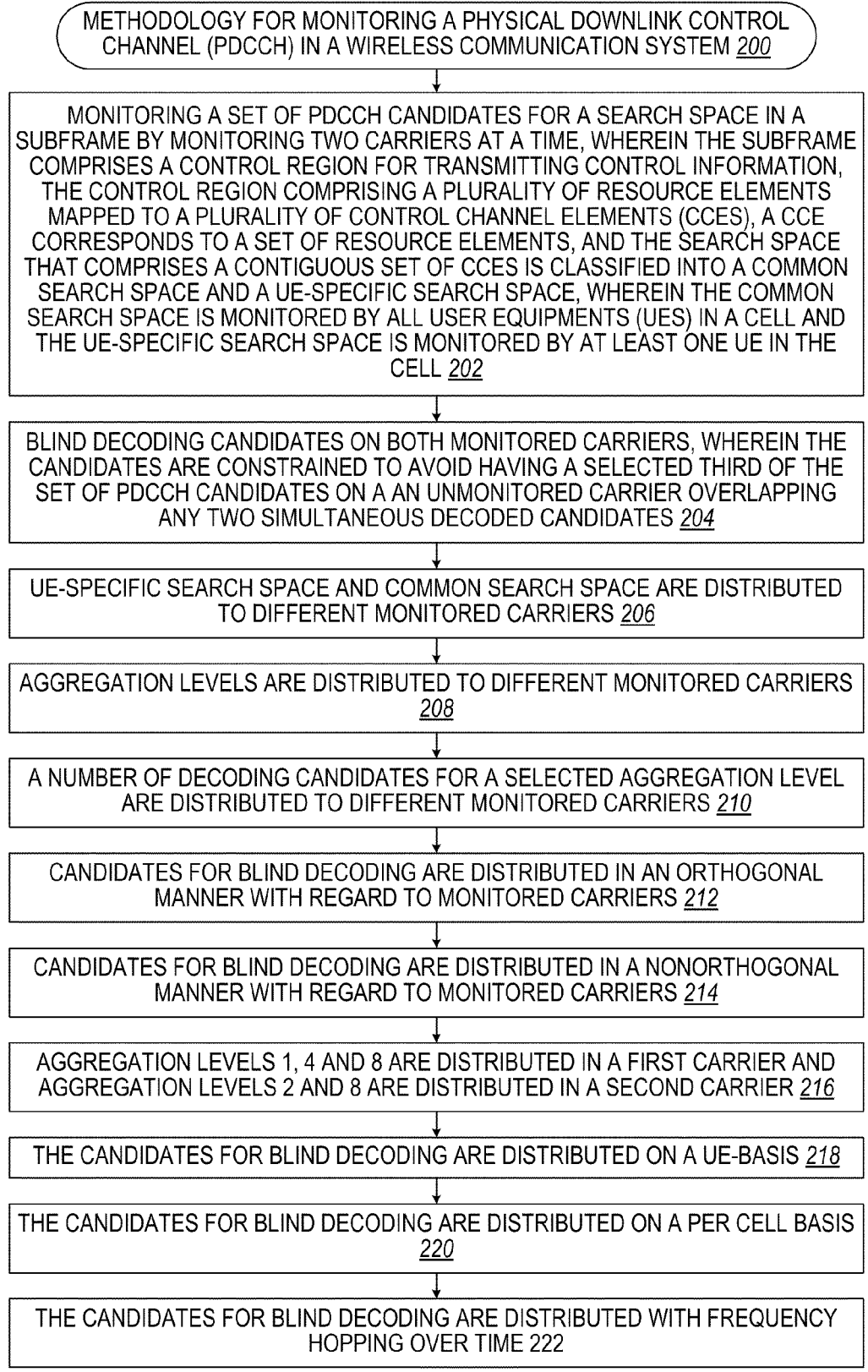
FIG. 2 depicts a flow diagram of a methodology or sequence of operations for transmitting and monitoring candidates distributed on PDCCH on multiple monitored carriers.

In FIG. 2, a methodology or sequence of operations 200 is provided for a physical downlink control channel (PDCCH) transmitted by a node and received by user equipment in a wireless communication system. A set of PDCCH candidates for a search space in a subframe are for monitoring two carriers at a time, wherein the subframe comprises a control region for transmitting control information, the control region comprising a plurality of resource elements mapped to a plurality of control channel elements (CCEs), a CCE corresponds to a set of resource elements, and the search space that comprises a contiguous set of CCEs is classified into a common search space and a DE-specific search space, wherein the common search space is monitored by all user equipments (DEs) in a cell and the DE-specific search space is monitored by at least one DE in the cell (block 202). A constraint is accessed for a Physical Downlink Control CHannel (PDCCH) that limits mapping of decoding candidates distributed on a plurality of carriers (block 204).

One or more techniques can be employed for the constraining distribution. In block 204, UE-specific search space and common search space are distributed to different monitored carriers. In block 206, aggregation levels are distributed to different monitored carriers. In block 208, a number of decoding candidates for a selected aggregation level are distributed to different monitored carriers. In block 210, candidates for blind decoding are distributed in an orthogonal manner with regard to monitored carriers. In block 212, aggregation levels 1 and 4 are distributed in a first carrier and aggregation levels 2 and 8 are distributed in a second carrier. In block 214, candidates for blind decoding are distributed in a nonorthogonal manner with regard to monitored carriers. In block 216, aggregation levels 1, 4 and 8 are distributed in a first carrier and aggregation levels 2 and 8 are distributed in a second carrier. In block 218, the candidates for blind decoding are distributed on a UE-basis. In block 220, the candidates for blind decoding are distributed on a per cell basis. In block 222, the candidates for blind decoding are distributed with frequency hopping over time.

Figure 3:
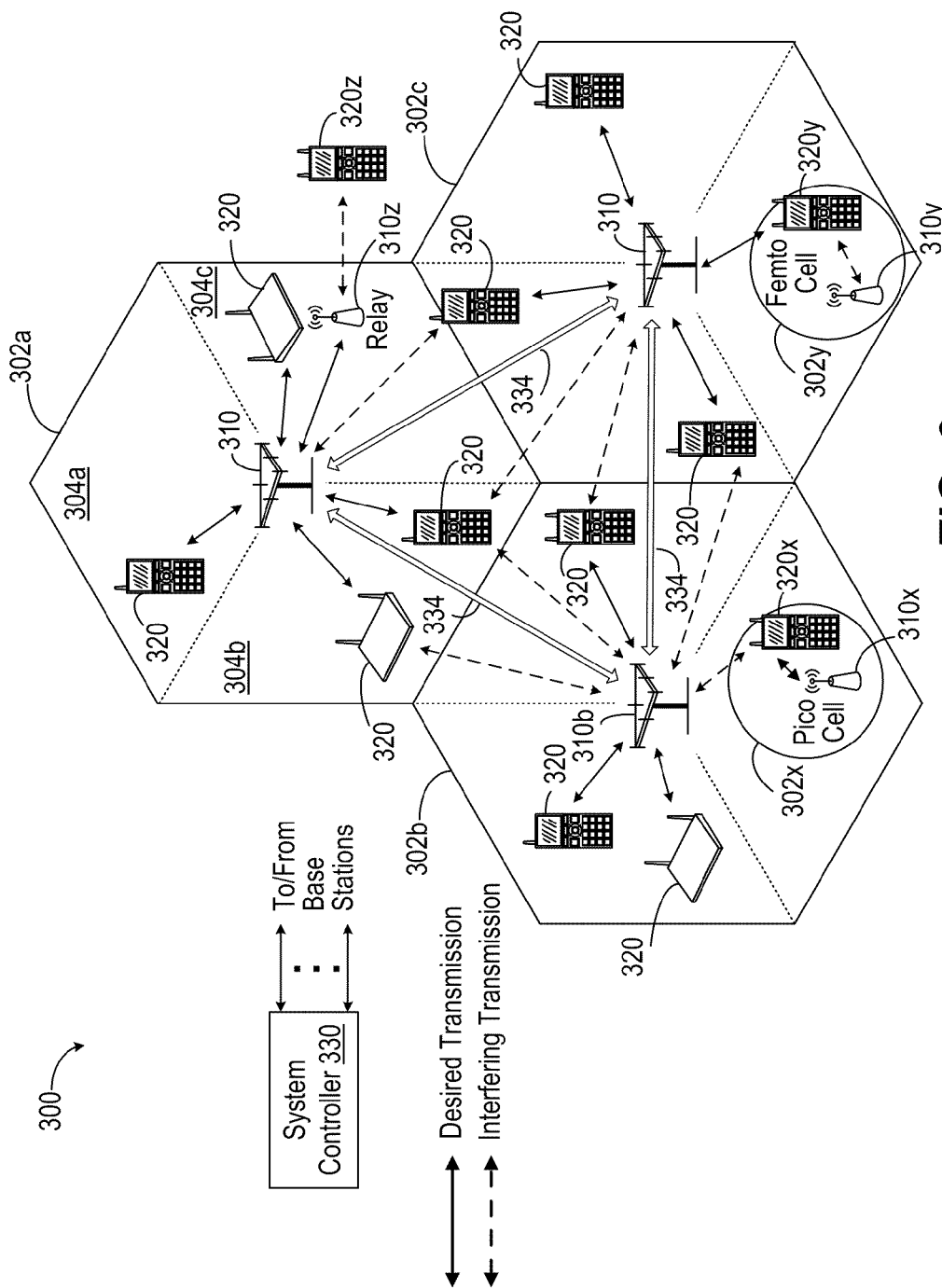
FIG. 3 depicts a heterogeneous wireless communication network for constraining multicarrier control channel blind decoding.

FIG. 3 shows a wireless communication network 300, which may include a number of base stations 310 and other network entities. A base station may be a station that communicates with the terminals and may also be referred to as an access point, a Node B, an evolved Node B, etc. Each base station 310 may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, and/or other types of cell. A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell, e.g., terminals belonging to a closed subscriber group (CSG). The CSG may include terminals for users in a home, terminals for users subscribing to a special service plan, etc. A base station for a macro cell may be referred to as a macro base station. A base station for a pico cell may be referred to as a pico base station. A base station for a femto cell may be referred to as a femto base station or a home base station.

In the example shown in FIG. 3, base stations 310a, 310b and 310c may be macro base stations for macro cells 302a, 302b and 302c, respectively. Base station 310x may be a pico base station for a pico cell 302x. Base station 310y may be a femto base station for a femto cell 302y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 3 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 410, where each group of antennas is responsible for communication with terminals 420 in a portion of the cell 302a, 302b, or 302c. For example, a base station 410 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
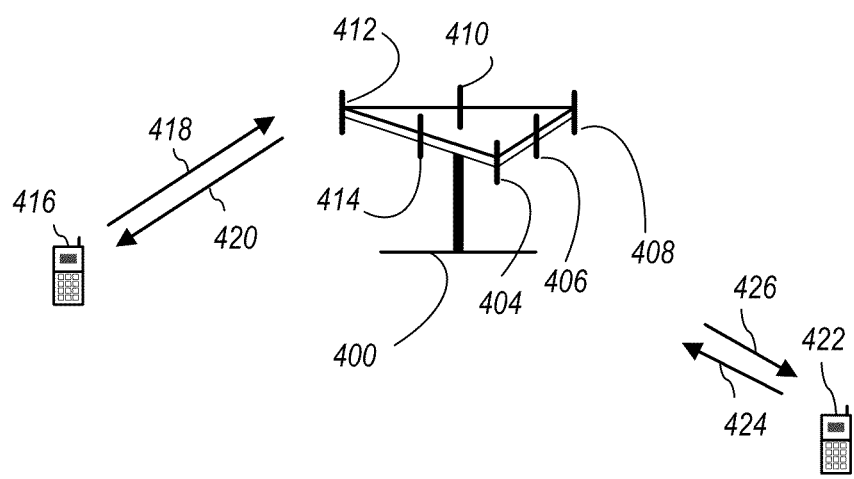
FIG. 4 depicts a macro base station for communication with UE that constrains multicarrier control channel blind decoding.

Referring to FIG. 4, a multiple access wireless communication system according to one aspect is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequency for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 424. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 5:
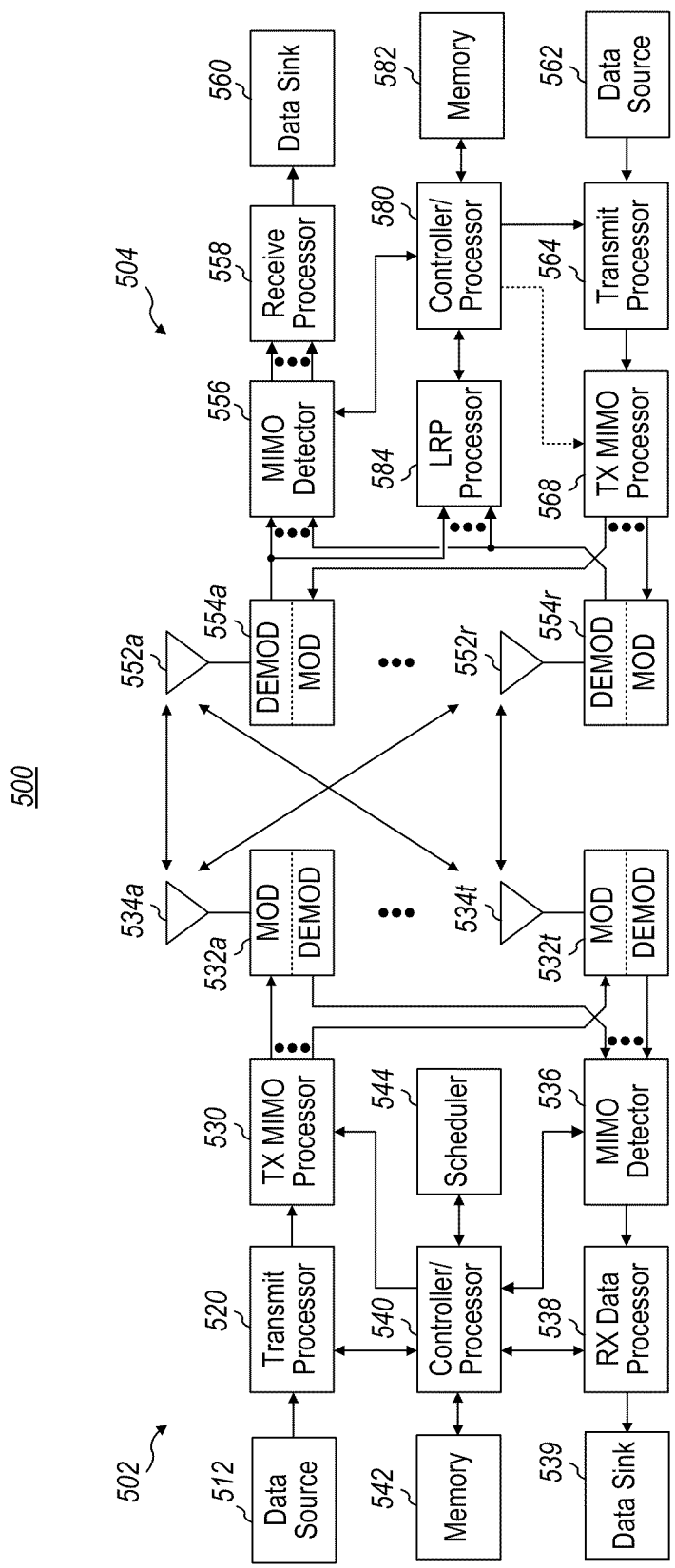
FIG. 5 depicts a block diagram of a communication system that constrains multicarrier control channel blind decoding.

FIG. 5 shows a block diagram of a design of communication system 500 between a base station 502 and a terminal 504, which may be one of the base stations and one of the terminals in FIG. 1. Base station 502 may be equipped with TX antennas 534a through 534t, and terminal 504 may be equipped with RX antennas 552a through 552r, where in general T≥1 and R≥1.

At base station 502, a transmit processor 520 may receive traffic data from a data source 512 and messages from a controller/processor 540. Transmit processor 520 may process (e.g., encode, interleave, and modulate) the traffic data and messages and provide data symbols and control symbols, respectively. Transmit processor 520 may also generate pilot symbols and data symbols for a low reuse preamble and pilot symbols for other pilots and/or reference signals. A transmit (TX) multiple-input multiple-output (MIMO) processor 530 may perform spatial processing (e.g., precoding) on the data symbols, the control symbols, and/or the pilot symbols, if applicable, and may provide T output symbol streams to T modulators (MODs) 532a through 532t. Each modulator 532 may process a respective output symbol stream (e.g., for OFDM, SC-FDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At terminal 504, antennas 552a through 552r may receive the downlink signals from base station 502 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, SC-FDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols, provide decoded traffic data for terminal 504 to a data sink 560, and provide decoded messages to a controller/processor 580. A low reuse preamble (LRP) processor 584 may detect for low reuse preambles from base stations and provide information for detected base stations or cells to controller/processor 580.

On the uplink, at terminal 504, a transmit processor 564 may receive and process traffic data from a data source 562 and messages from controller/processor 580. The symbols from transmit processor 564 may be precoded by a TX MIMO processor 566 if applicable, further processed by modulators 554a through 554r, and transmitted to base station 502. At base station 502, the uplink signals from terminal 504 may be received by antennas 534, processed by demodulators 532, detected by a MIMO detector 536 if applicable, and further processed by a receive processor 538 to obtain the decoded packets and messages transmitted by terminal 504.

Controllers/processors 540 and 580 may direct the operation at base station 502 and terminal 504, respectively. Processor 540 and/or other processors and modules at base station 502 may perform or direct processes for the techniques described herein. Processor 584 and/or other processors and modules at terminal 504 may perform or direct processes for the techniques described herein. Memories 542 and 582 may store data and program codes for base station 502 and terminal 504, respectively, or dynamically perform storing. A scheduler 544 may schedule terminals for data transmission on the downlink and/or uplink and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 6:
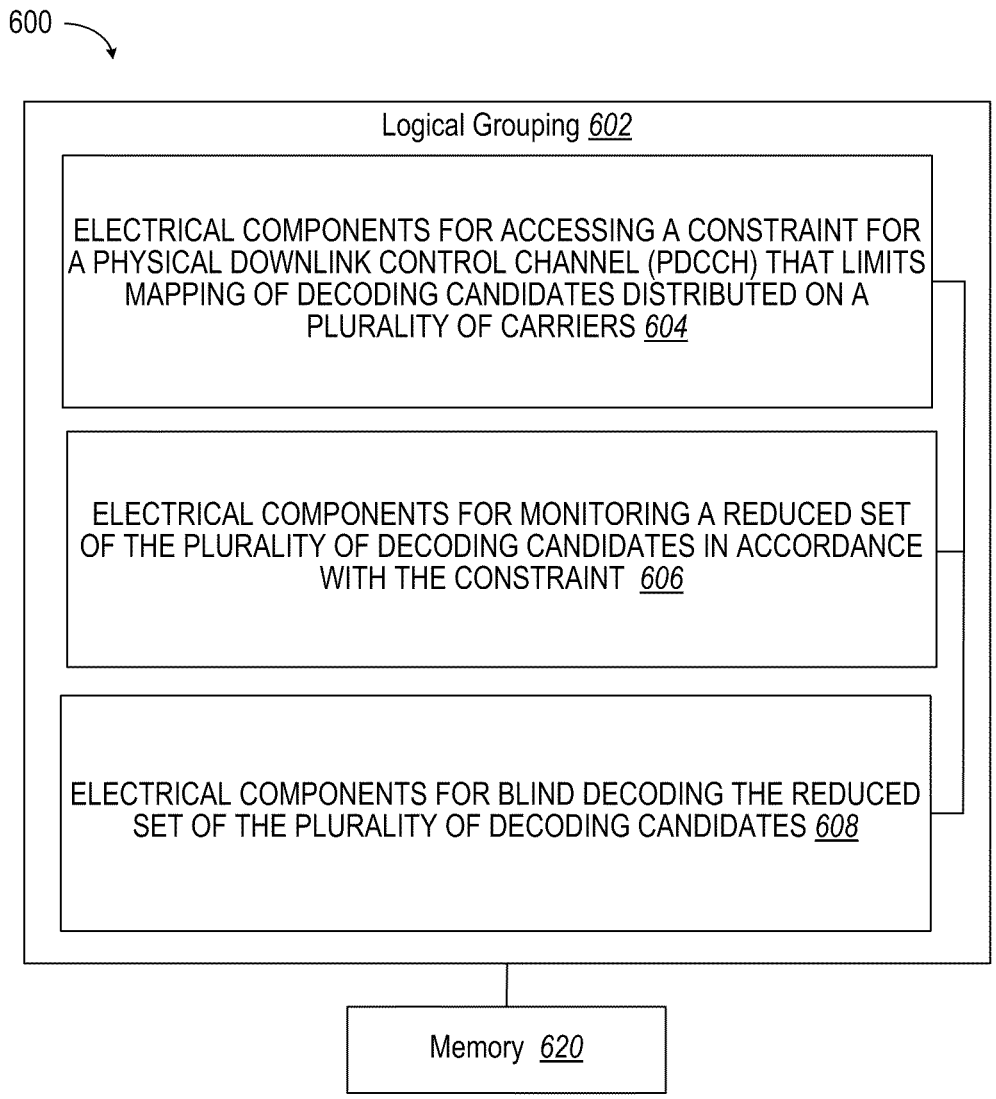
FIG. 6 depicts a block diagram of a logical grouping of electrical components for monitoring a physical downlink control channel (PDCCH) in a wireless communication system.

With reference to FIG. 6, illustrated is a system 600 for monitoring a Physical Downlink Control CHannel (PDCCH) in a wireless communication system for receiving broadcast, multicast or unicast information. For example, system 600 can reside at least partially in user equipment (UE). It is to be appreciated that system 600 is represented as including functional blocks, which can be functional blocks that represent functions implemented by a computing platform, processor, software, or combination thereof (e.g., firmware). System 600 includes a logical grouping 602 of electrical components that can act in conjunction. For instance, logical grouping 602 can include an electrical component for accessing a constraint for a Physical Downlink Control CHannel (PDCCH) that limits mapping of decoding candidates distributed on a plurality of carriers 604. Moreover, logical grouping 602 can include an electrical component for monitoring a reduced set of decoding candidates in accordance with the constraint 606. In addition, logical grouping 602 can include an electrical component for blind decoding the reduced set of decoding candidates 608. Additionally, system 600 can include a memory 620 that retains instructions for executing functions associated with electrical components 604-608. While shown as being external to memory 620, it is to be understood that one or more of electrical components 604-608 can exist within memory 620.

Figure 7:
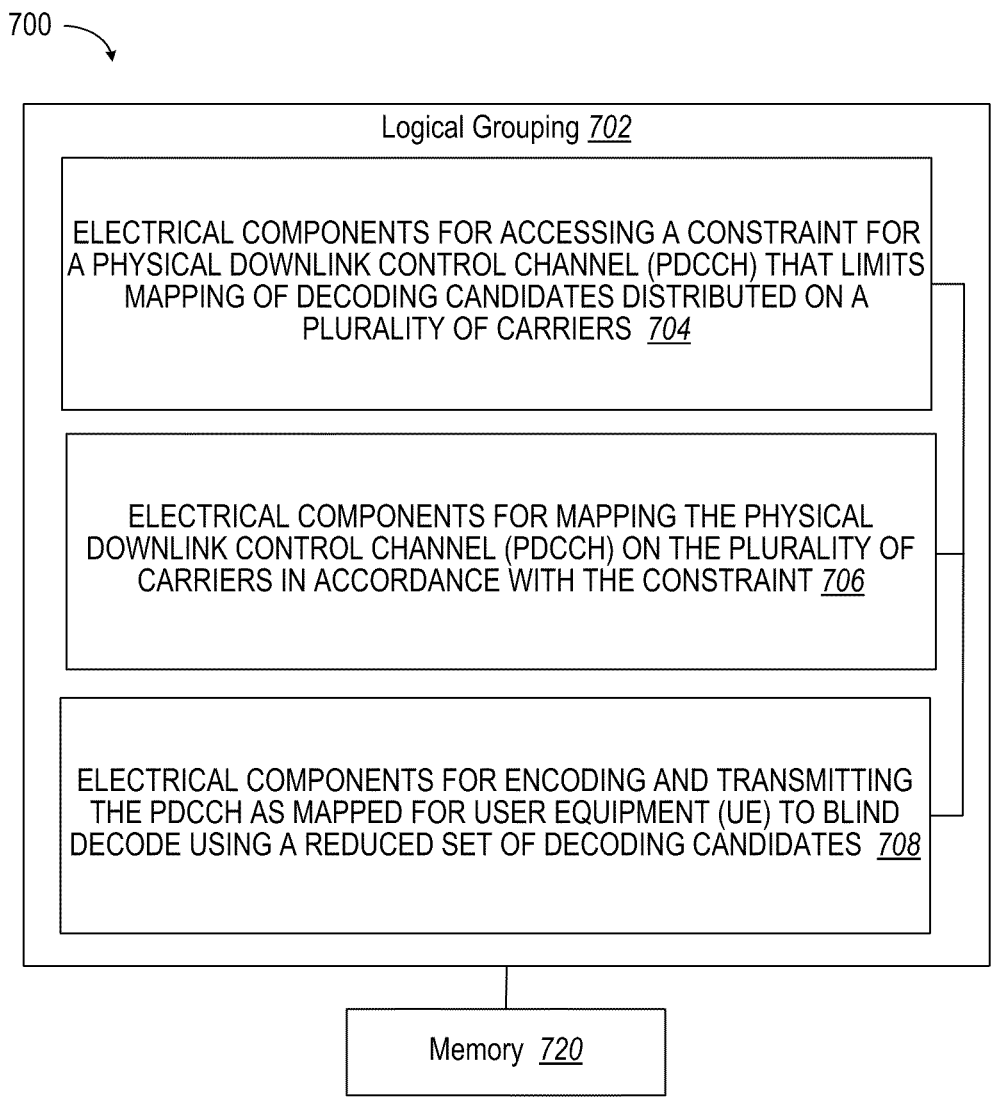
FIG. 7 depicts a block diagram of a logical grouping of electrical components for transmitting a physical downlink control channel (PDCCH) in a wireless communication system.

With reference to FIG. 7, illustrated is a system 700 for transmitting a Physical Downlink Control CHannel (PDCCH) in a wireless communication system for sending broadcast, multicast or unicast information. For example, system 700 can reside at least partially within a network entity (e.g., evolved base node). It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component for accessing a constraint for a Physical Downlink Control CHannel (PDCCH) that limits mapping of decoding candidates distributed on a plurality of carriers 704. Moreover, logical grouping 702 can include an electrical component for mapping the Physical Downlink Control CHannel (PDCCH) on the plurality of carriers in accordance with the constraint 706. In addition, logical grouping 702 can include an electrical component for encoding and transmitting the PDCCH as mapped for user equipment (UE) to blind decode using a reduced set of decoding candidates 708. Additionally, system 700 can include a memory 720 that retains instructions for executing functions associated with electrical components 704-708. While shown as being external to memory 720, it is to be understood that one or more of electrical components 704-708 can exist within memory 720.

Figure 8:
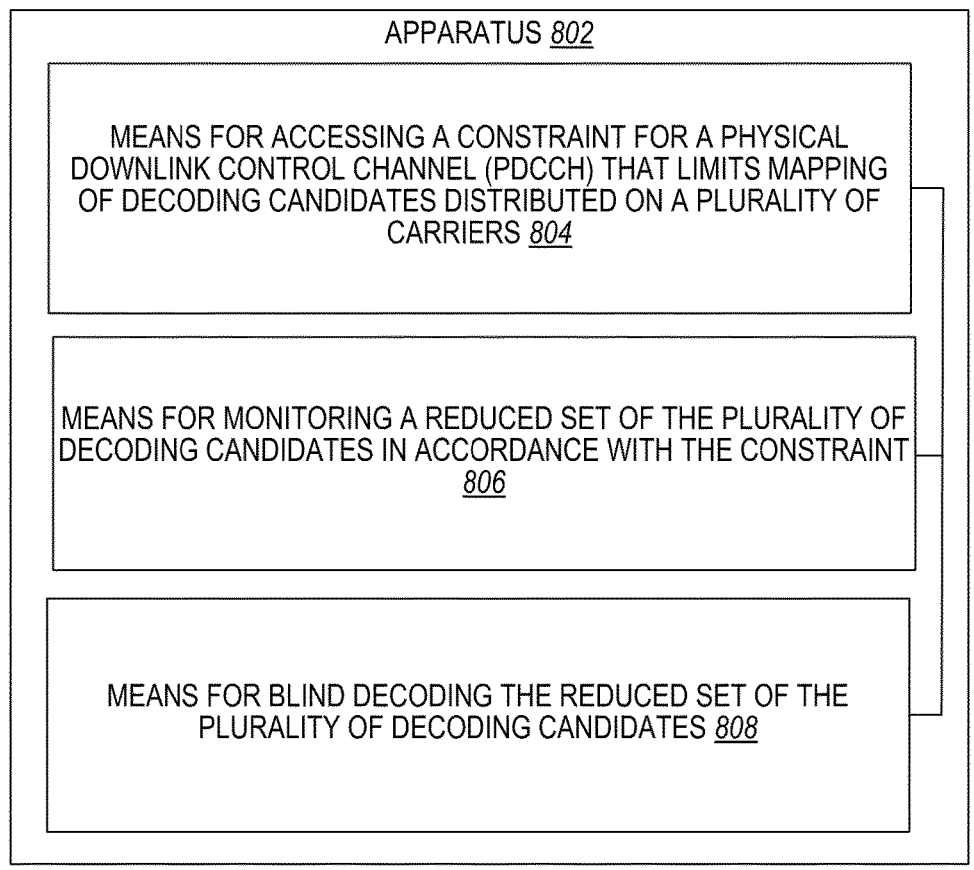
FIG. 8 depicts a block diagram of an apparatus having means for monitoring a physical downlink control channel (PDCCH) in a wireless communication system.

In FIG. 8, an apparatus 802 is depicted for monitoring a Physical Downlink Control CHannel (PDCCH) in a wireless communication system for receiving broadcast, multicast or unicast information. Means 804 are provided for accessing a constraint for a Physical Downlink Control CHannel (PDCCH) that limits mapping of decoding candidates distributed on a plurality of carriers. Means 806 are provided for monitoring a reduced set of decoding candidates in accordance with the constraint. Means 808 are provided for blind decoding the reduced set of decoding candidates.

Figure 9:
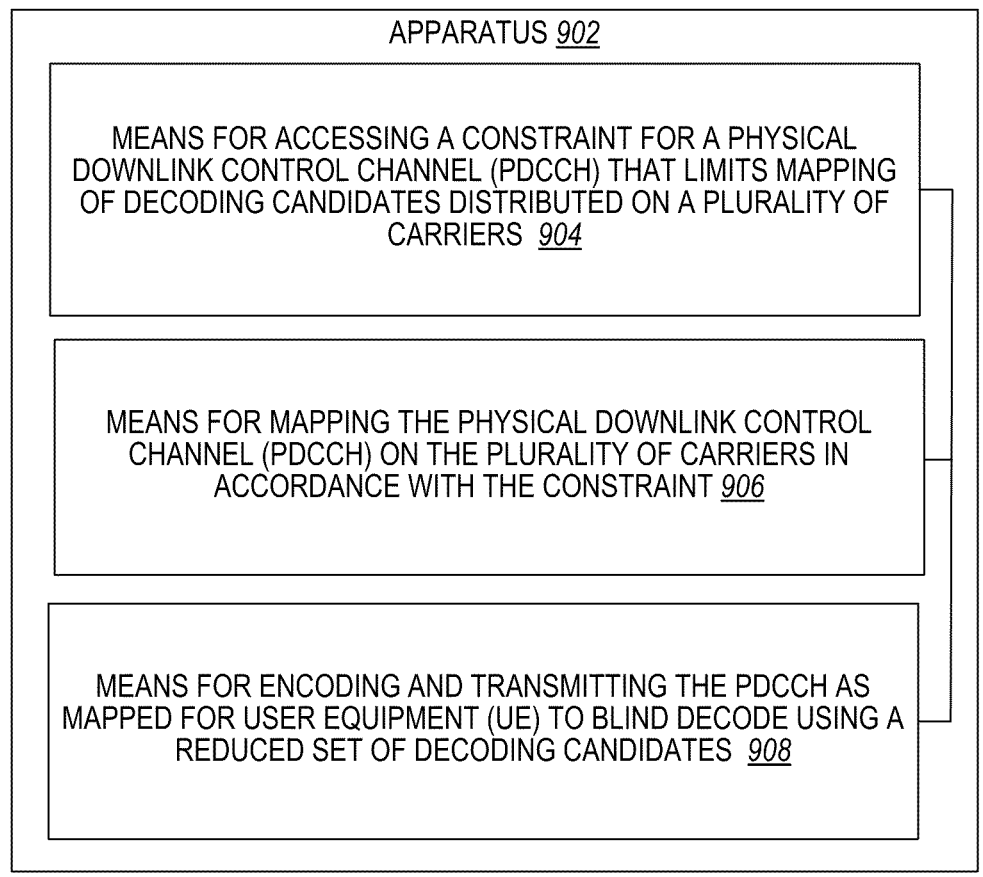
FIG. 9 depicts a block diagram of an apparatus having means for transmitting a physical downlink control channel (PDCCH) in a wireless communication system.

In FIG. 9, an apparatus 902 is depicted for transmitting a Physical Downlink Control CHannel (PDCCH) in a wireless communication system for sending broadcast, multicast or unicast information. Means 904 are provided for accessing a constraint for a Physical Downlink Control CHannel (PDCCH) that limits mapping of decoding candidates distributed on a plurality of carriers. Means 906 are provided for mapping the Physical Downlink Control CHannel (PDCCH) on the plurality of carriers in accordance with the constraint. Means 908 are provided for encoding and transmitting the PDCCH as mapped for user equipment (UE) to blind decode using a reduced set of decoding candidates.

Figure 10A:
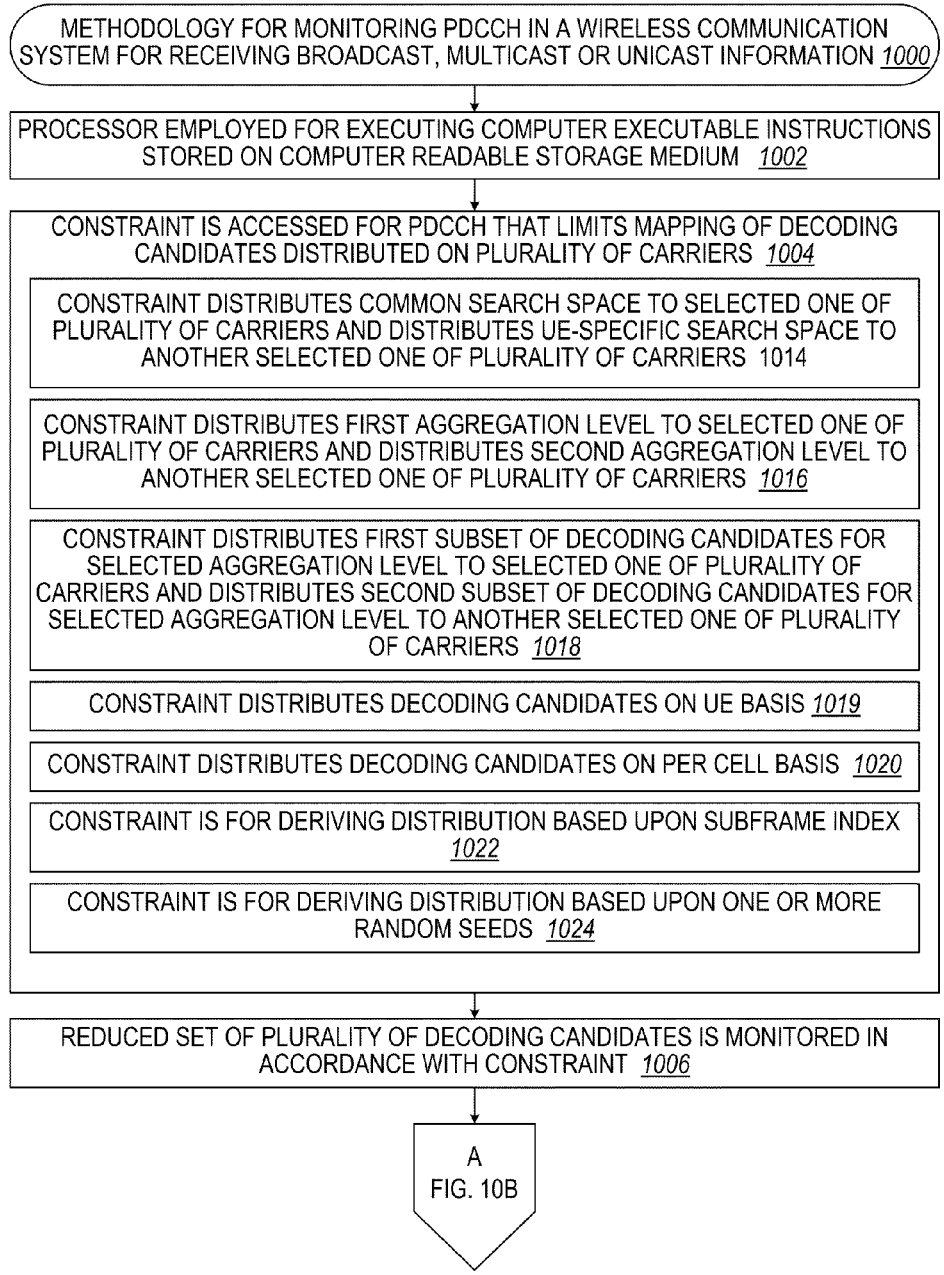
FIGS. 10A-10B depict a flow diagram of a methodology or sequence of operations for monitoring a Physical Downlink Control CHannel (PDCCH) in a wireless communication system for receiving broadcast, multicast or unicast information.
Figure 10B:
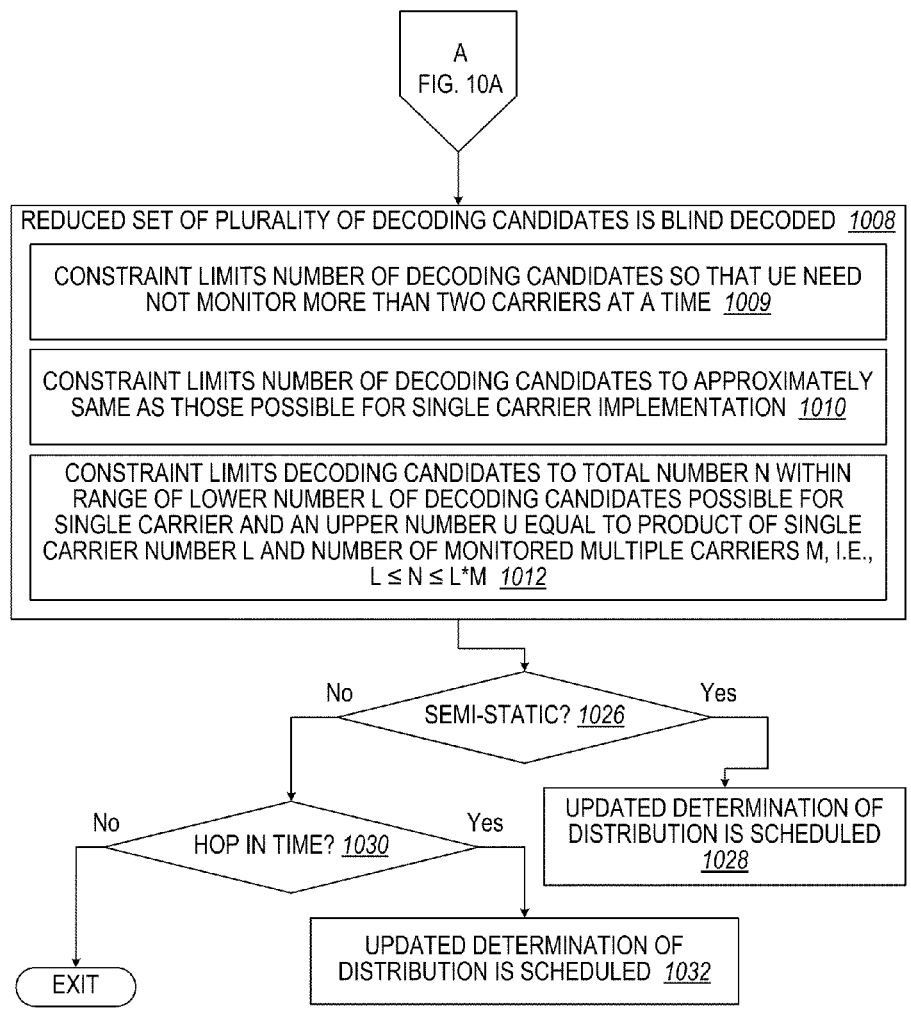

In FIGS. 10A-10B, a methodology or sequence of operations 1000 is provided for monitoring a Physical Downlink Control CHannel (PDCCH) in a wireless communication system for receiving broadcast, multicast or unicast information. A processor is employed for executing computer executable instructions stored on a computer readable storage medium to implement the methodology (block 1002). A constraint is accessed for a Physical Downlink Control CHannel (PDCCH) that limits mapping of decoding candidates distributed on a plurality of carriers (block 1004). A reduced set of the plurality of decoding candidates is monitored in accordance with the constraint (block 1006). The reduced set of decoding candidates is blind decoded (block 1008). In one aspect, the constraint limits distribution of the PDCCH such that the UE avoids needing to monitor more than two carriers at a time (block 1009). In particular, the constraint can limit the number of decoding candidates to approximately the same as those possible for a single carrier implementation (block 1010). Alternatively, the constraint limits the decoding candidates to a total number N within a range of a lower number L of decoding candidates possible for a single carrier and an upper number U equal to a product of the single carrier lower number L and a number of monitored multiple carriers M, i.e., $L \leq N \leq L*M$ (block 1012).

The constraint accessed in block 1002 can entail one or more characteristics for limiting the number of blind decoding that has to be accomplished to successfully receive PDCCH sent via multiple carriers. In one aspect, the constraint distributes a common search space to a selected one of the plurality of carriers and distributes user equipment specific search space to another selected one of the plurality of carriers (block 1014). In another aspect, the constraint distributes a first aggregation level to a selected one of the plurality of carriers and distributes a second aggregation level to another selected one of the plurality of carriers (block 1016). In an additional aspect, the constraint distributes a first subset of decoding candidates for a selected aggregation level to a selected one of the plurality of carriers and distributes a second subset of decoding candidates for the selected aggregation level to another selected one of the plurality of carriers (block 1018). In another additional aspect, the constraint distributes decoding candidates on user equipment basis (block 1019). In a further aspect, the constraint distributes decoding candidates on a per cell basis (block 1020). In yet one aspect, the constraint is for deriving a distribution based upon a subframe index (block 1022). In yet another aspect, the constraint is for deriving a distribution based upon a random seed or a plurality of random seeds (block 1024).

A determination can be made whether the distribution of the PDCCH occurs semi-statically (block 1026), and if so an updated determination of distribution is scheduled (block 1028).

A determination can be made whether the distribution of the PDCCH hops with time (block 1030), and if so an updated determination of distribution is scheduled (block 1032).

Figure 11A:
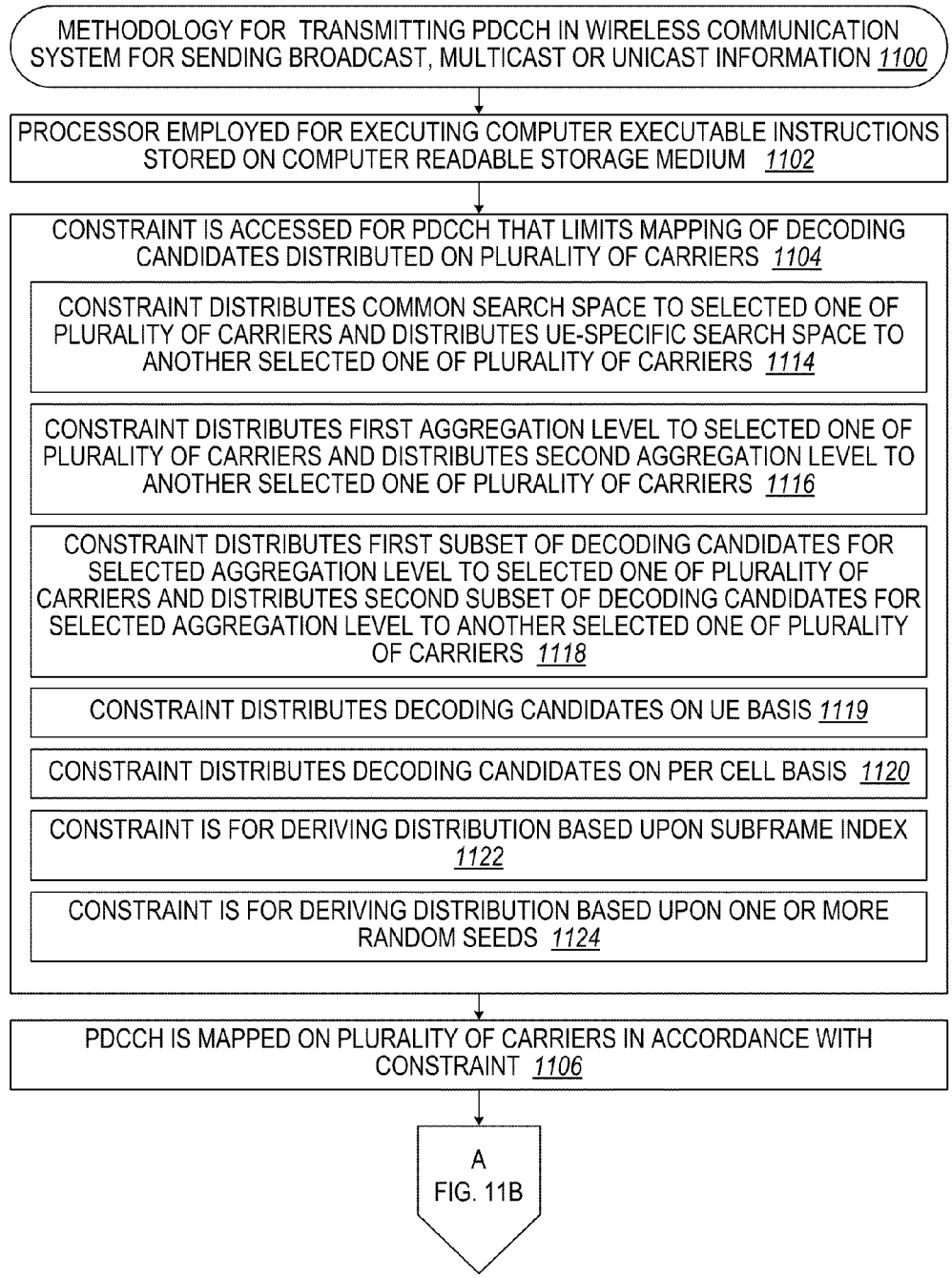
FIGS. 11A-11B depict a flow diagram of a methodology or sequence of operations for transmitting a Physical Downlink Control CHannel (PDCCH) in a wireless communication system for sending broadcast, multicast or unicast information.
Figure 11B:
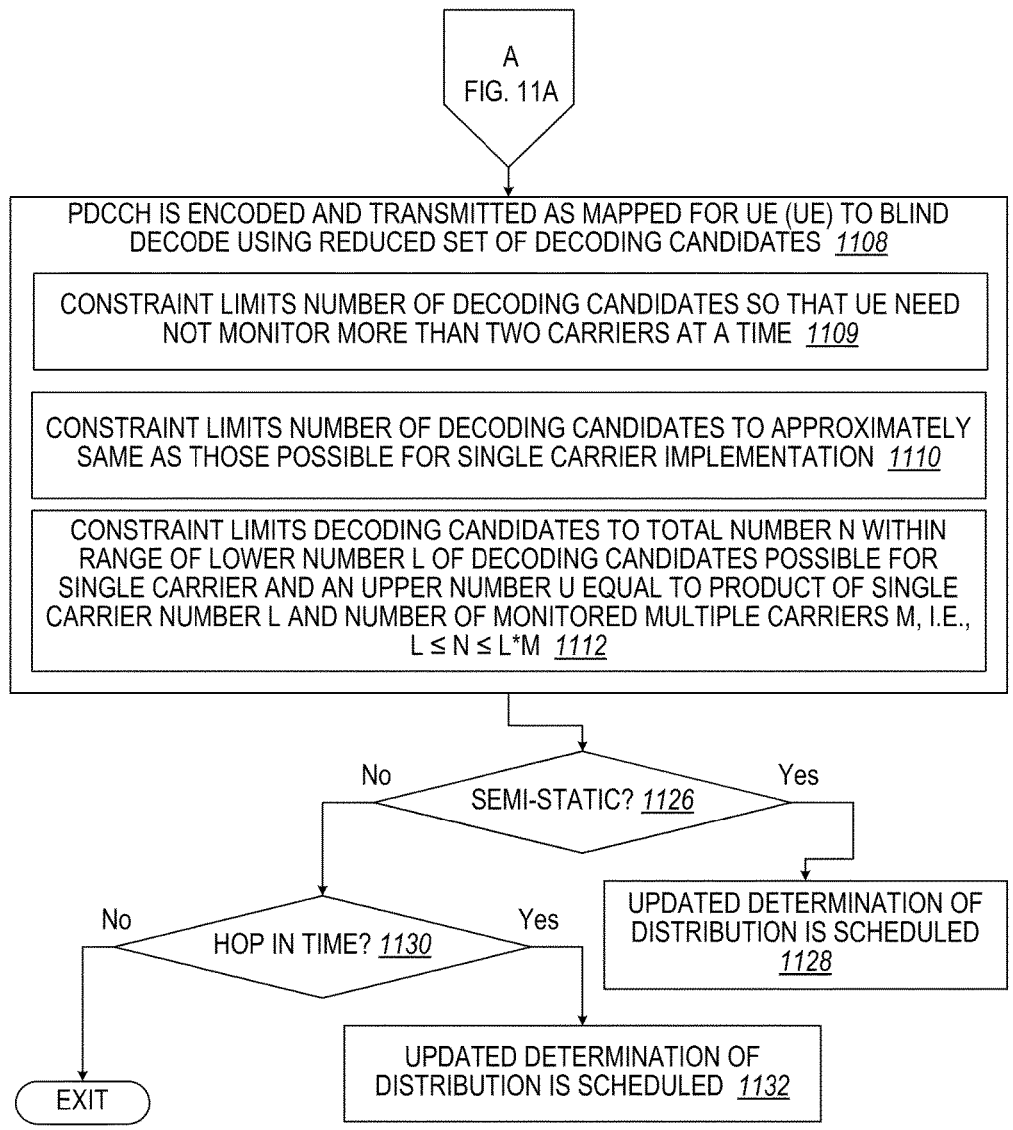

In FIGS. 11A-11B, a methodology or sequence of operations 1100 is provided for transmitting a Physical Downlink Control CHannel (PDCCH) in a wireless communication system for sending broadcast, multicast or unicast information. A processor is employed for executing computer executable instructions stored on a computer readable storage medium to implement the methodology (block 1102). A constraint is accessed for a Physical Downlink Control CHannel (PDCCH) that limits mapping of decoding candidates distributed on a plurality of carriers (block 1104). The Physical Downlink Control CHannel (PDCCH) is mapped on the plurality of carriers in accordance with the constraint (block 1106). The PDCCH is encoded and transmitted as mapped for user equipment (UE) to blind decode using a reduced set of decoding candidates (block 1108). In one aspect, the constraint limits distribution of the PDCCH such that the UE avoids needing to monitor more than two carriers at a time (block 1109). In particular, the constraint can limit the number of decoding candidates to approximately the same as those possible for a single carrier implementation (block 1110). Alternatively, the constraint limits the decoding candidates to a total number N within a range of a lower number L of decoding candidates possible for a single carrier and an upper number U equal to a product of the single carrier lower number L and a number of monitored multiple carriers M, i.e., $L \leq N \leq L*M$ (block 1112).

The constraint accessed in block 1102 can entail one or more characteristics for limiting the number of blind decoding that has to be accomplished to successfully receive PDCCH sent via multiple carriers. In one aspect, the constraint distributes a common search space to a selected one of the plurality of carriers and distributes user equipment specific search space to another selected one of the plurality of carriers (block 1114). In another aspect, the constraint distributes a first aggregation level to a selected one of the plurality of carriers and distributes a second aggregation level to another selected one of the plurality of carriers (block 1116). In an additional aspect, the constraint distributes a first subset of decoding candidates for a selected aggregation level to a selected one of the plurality of carriers and distributes a second subset of decoding candidates for the selected aggregation level to another selected one of the plurality of carriers (block 1118). In another additional aspect, the constraint distributes decoding candidates on user equipment basis. In a further aspect, the constraint distributes decoding candidates on a per cell basis (block 1120). In yet one aspect, the constraint is for deriving a distribution based upon a subframe index (block 1122). In yet another aspect, the constraint is for deriving a distribution based upon one or more random seeds (block 1124).

A determination can be made whether the distribution of the PDCCH occurs semi-statically (block 1126), and if so an updated determination of distribution is scheduled (block 1128).

A determination can be made whether the distribution of the PDCCH hops with time (block 1130), and if so an updated determination of distribution is scheduled (block 1132).

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for monitoring a Physical Downlink Control CHannel (PDCCH) in a wireless communication system for receiving broadcast, multicast or unicast information, comprising:
accessing, by one or more computer processors, a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;
monitoring, by the one or more computer processors, a reduced set of decoding candidates on the at least two carriers of the plurality of carriers in accordance with the constraint; and
blind decoding, by the one or more computer processors, the reduced set of decoding candidates.

2. The method of claim 1, further comprising accessing the constraint that limits distribution for a selected at least one of the plurality of carriers to a selected one of a common search space and a user equipment specific search space.

3. The method of claim 1, further comprising accessing the constraint that limits distribution for a selected at least one of the plurality of carriers to a selected subset of aggregation levels for a search space.

4. The method of claim 1, further comprising accessing the constraint that limits distribution for a selected at least one of the plurality of carriers to a selected subset of decoding candidates for an aggregation level and a search space.

5. The method of claim 1, further comprising accessing the constraint that distributes decoding candidates on a user equipment basis.

6. The method of claim 1, further comprising accessing the constraint that distributes decoding candidates on a per cell basis.

7. The method of claim 1, further comprising accessing the constraint by deriving a distribution based upon a subframe index.

8. The method of claim 1, further comprising accessing the constraint by deriving a distribution based upon a random seed.

9. The method of claim 1, further comprising accessing the constraint that distributes decoding candidates based on at least a user equipment identifier, a cell identifier, a subframe index, or a random seed.

10. The method of claim 1, wherein distribution of the Physical Downlink Control CHannel (PDCCH) occurs semi-statically.

11. The method of claim 1, wherein distribution of the Physical Downlink Control CHannel (PDCCH) occurs with hops with time.

12. The method of claim 1, further comprising accessing the constraint that avoids having to monitor more than two carriers at a time.

13. The method of claim 1, further comprising accessing the constraint that limits the decoding candidates to a number corresponding to a number of possible decoding candidates for a single carrier.

14. The method of claim 1, further comprising accessing the constraint that limits the decoding candidates to a total number N within a range of a single carrier lower number L of decoding candidates and an upper number U equal to a product of the single carrier lower number L and a number of monitored multiple carriers M.

15. The method of claim 1, further comprising monitoring the reduced set of decoding candidates that are uniformly distributed across carriers.

16. The method of claim 1, further comprising monitoring the reduced set of decoding candidates that are non-uniformly distributed across carriers.

17. The method of claim 1, further comprising accessing the constraint that limits the plurality of carriers to have a total number of decoding candidates that corresponds to a single carrier.

18. A computer program product for monitoring a Physical Downlink Control CHannel (PDCCH) in a wireless communication system for receiving broadcast, multicast or unicast information, comprising:
at least one non-transitory computer readable storage medium storing computer executable instructions that, when executed by the at least one processor, implement components comprising:
a first set of instructions for causing a computer to access a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;
a second set of instructions for causing the computer to monitor a reduced set of decoding candidates on the at least two carriers of the plurality of carriers in accordance with the constraint; and
a third set of instructions for causing the computer to blind decode the reduced set of decoding candidates.

19. An apparatus for monitoring a Physical Downlink Control CHannel (PDCCH) in a wireless communication system for receiving broadcast, multicast or unicast information, comprising:
at least one processor;
at least one non-transitory computer readable storage medium storing computer executable instructions that, when executed by the at least one processor, implement components comprising:
means for accessing a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;
means for monitoring a reduced set of decoding candidates on the at least two carriers of the plurality of carriers in accordance with the constraint; and
means for blind decoding the reduced set of decoding candidates.

20. An apparatus for monitoring a Physical Downlink Control CHannel (PDCCH) in a wireless communication system for receiving broadcast, multicast or unicast information, comprising:
a computing platform for accessing a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;
a receiver for monitoring a reduced set of decoding candidates on the at least two carriers of the plurality of carriers in accordance with the constraint; and
a decoder for blind decoding the reduced set of decoding candidates.

21. The apparatus of claim 20, wherein the computing platform is further for accessing the constraint that limits distribution for a selected at least one of the plurality of carriers to a selected one of a common search space and a user equipment specific search space.

22. The apparatus of claim 20, wherein the computing platform is further for accessing the constraint that limits distribution for a selected at least one of the plurality of carriers to a selected subset of aggregation levels for a search space.

23. The apparatus of claim 20, wherein the computing platform is further for accessing the constraint that limits distribution for a selected at least one of the plurality of carriers to a selected subset of decoding candidates for an aggregation level and a search space.

24. The apparatus of claim 20, wherein the computing platform is further for accessing the constraint that distributes decoding candidates on a user equipment basis.

25. The apparatus of claim 20, wherein the computing platform is further for accessing the constraint that distributes decoding candidates on a per cell basis.

26. The apparatus of claim 20, wherein the computing platform is further for accessing the constraint by deriving a distribution based upon a subframe index.

27. The apparatus of claim 20, wherein the computing platform is further for accessing the constraint by deriving a distribution based upon a random seed.

28. The apparatus of claim 20, wherein the computing platform is further for accessing the constraint that distributes decoding candidates based on at least a user equipment identifier, a cell identifier, a subframe index, or a random seed.

29. The apparatus of claim 20, wherein distribution of the Physical Downlink Control CHannel (PDCCH) occurs semi-statically.

30. The apparatus of claim 20, wherein distribution of the Physical Downlink Control CHannel (PDCCH) occurs with hops with time.

31. The apparatus of claim 20, wherein the computing platform is further for accessing the constraint that avoids having to monitor more than two carriers at a time.

32. The apparatus of claim 20, wherein the computing platform is further for accessing the constraint that limits the decoding candidates to a number corresponding to a number of possible decoding candidates for a single carrier.

33. The apparatus of claim 20, wherein the computing platform is further for accessing the constraint that limits the decoding candidates to a total number N within a range of a single carrier lower number L of decoding candidates and an upper number U equal to a product of the single carrier lower number L and a number of monitored multiple carriers M.

34. The apparatus of claim 20, wherein the receiver is further for monitoring the reduced set of decoding candidates that are uniformly distributed across carriers.

35. The apparatus of claim 20, wherein the receiver is further for monitoring the reduced set of decoding candidates that are non-uniformly distributed across carriers.

36. The apparatus of claim 20, wherein the computing platform is further for accessing the constraint that limits the plurality of carriers to have a total number of decoding candidates that corresponds to a single carrier.

37. A method for transmitting a Physical Downlink Control CHannel (PDCCH) in a wireless communication system for sending broadcast, multicast or unicast information, comprising:

accessing, by one or more computer processors, a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;

mapping, by the one or more computer processors, the Physical Downlink Control CHannel (PDCCH) on the plurality of carriers in accordance with the constraint; and encoding and transmitting, by the one or more computer processors, the Physical Downlink Control CHannel (PDCCH) as mapped for user equipment (UE) to blind decode using a reduced set of decoding candidates on the at least two carriers of the plurality of carriers.

38. A computer program product for transmitting a Physical Downlink Control CHannel (PDCCH) in a wireless communication system for sending broadcast, multicast or unicast information, comprising:

at least one non-transitory computer readable storage medium storing computer executable instructions that, when executed by at least one processor, implement components comprising:

a first set of instructions for causing a computer to access a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriersv, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;

a second set of instructions for causing the computer to map the Physical Downlink Control CHannel (PDCCH) on the plurality of carriers in accordance with the constraint; and a third set of instructions for causing the computer to encode and transmit the Physical Downlink Control CHannel (PDCCH) as mapped for user equipment (UE) to blind decode using a reduced set of decoding candidates on the at least two carriers of the plurality of carriers.

39. An apparatus for transmitting a Physical Downlink Control CHannel (PDCCH) in a wireless communication system for sending broadcast, multicast or unicast information, comprising:

at least one processor;

at least one non-transitory computer readable storage medium storing computer executable instructions that, when executed by the at least one processor, implement components comprising:

means for accessing a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;

means for mapping the Physical Downlink Control CHannel (PDCCH) on the plurality of carriers in accordance with the constraint; and means for enecoding and transmitting the Physical Downlink Control CHannel (PDCCH) as mapped for user equipment (UE) to blind decode using a reduced set of decoding candidates on the at least two carriers of the plurality of carriers.

40. An apparatus for transmitting a Physical Downlink Control CHannel (PDCCH) in a wireless communication system for sending broadcast, multicast or unicast information, comprising:

a computing platform for accessing a constraint for a Physical Downlink Control CHannel (PDCCH) that limits mapping of decoding candidates distributed on a plurality of carriers, each of which corresponds to one or more control channel elements (CCEs), wherein each of the one or more CCEs corresponds to a set of resource elements (REs), wherein the constraint includes one or more characteristics for limiting a number of blind decoding that has to be performed to successfully receive PDCCH sent via one or more carriers, wherein at least two carriers of the plurality of carriers are distributed with decoding candidates with different characteristics to avoid the decoding candidates with different characteristics distributed on the one or more CCEs of the at least two carriers of the plurality of carriers from overlapping each other, wherein the different characteristics include one or more of: different search spaces, or different subsets of aggregation levels;

a mapping/encoder for mapping and encoding the Physical Downlink Control CHannel (PDCCH) on the plurality of carriers in accordance with the constraint; and a transmitter for transmitting the Physical Downlink Control CHannel (PDCCH) as mapped and encoded for user equipment (UE) to blind decode using a reduced set of decoding candidates on the at least two carriers of the plurality of carriers.

41. The apparatus of claim 40, wherein the computing platform is further for accessing the constraint that limits distribution for a selected at least one of the plurality of carriers to a selected one of a common search space and a user equipment specific search space.

42. The apparatus of claim 40, wherein the computing platform is further for accessing the constraint that limits distribution for a selected at least one of the plurality of carriers to a selected subset of aggregation levels for a search space.

43. The method of claim 1, wherein the constraint limits a common search space to a particular one of the plurality of carriers and user equipment-specific search spaces to one or more of the plurality of carriers.

44. The method of claim 1, wherein the constraint limits a number of carriers on which blind decoding is to be attempted.

45. The computer program product of claim 18, wherein the constraint limits a common search space to a particular one of the plurality of carriers and user equipment-specific search spaces to multiple ones of the plurality of carriers.

46. The computer program product of claim 18, wherein the constraint limits a number of carriers on which blind decoding is to be attempted.

47. The apparatus of claim 19, wherein the constraint limits a common search space to a particular one of the plurality of carriers and user equipment-specific search spaces to multiple ones of the plurality of carriers.

48. The apparatus of claim 19, wherein the constraint limits a number of carriers on which blind decoding is to be attempted.

49. The apparatus of claim 20, wherein the constraint limits a common search space to a particular one of the plurality of carriers and user equipment-specific search spaces to multiple ones of the plurality of carriers.

50. The apparatus of claim 20, wherein the constraint limits a number of carriers on which blind decoding is to be attempted.

51. The method of claim 37, wherein the constraint limits a common search space to a particular one of the plurality of carriers and user equipment-specific search spaces to multiple ones of the plurality of carriers.

52. The method of claim 37, wherein the constraint limits a number of carriers on which blind decoding is to be attempted.

53. The computer program product of claim 38, wherein the constraint limits a common search space to a particular one of the plurality of carriers and user equipment-specific search spaces to multiple ones of the plurality of carriers.

54. The computer program product of claim 38, wherein the constraint limits a number of carriers on which blind decoding is to be attempted.

55. The apparatus of claim 39, wherein the constraint limits a common search space to a particular one of the plurality of carriers and user equipment-specific search spaces to multiple ones of the plurality of carriers.

56. The apparatus of claim 39, wherein the constraint limits a number of carriers on which blind decoding is to be attempted.

57. The apparatus of claim 40, wherein the constraint limits a common search space to a particular one of the plurality of carriers and user equipment-specific search spaces to multiple ones of the plurality of carriers.

58. The apparatus of claim 40, wherein the constraint limits a number of carriers on which blind decoding is to be attempted.

* * * * *